Figure 1:
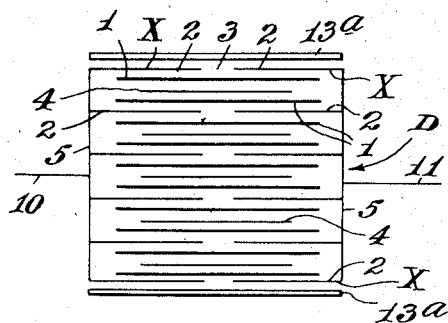

June 28, 1932.  W. H. PRIESS  1,865,046

ELECTRICAL CONDENSER

Original Filed Jan. 6, 1922

INVENTOR
WILLIAM H. PRIESS
BY
ATTORNEY

Patented June 28, 1932

1,865,046

UNITED STATES PATENT OFFICE

WILLIAM H. PRIESS, OF UPPER MONTCLAIR, NEW JERSEY, ASSIGNOR, BY MESNE ASSIGNMENTS, TO GENERAL ELECTRIC COMPANY, A CORPORATION OF NEW YORK

ELECTRICAL CONDENSER

Original application filed January 6, 1922, Serial No. 527,449. Divided and this application filed April 27, 1926. Serial No. 104,881.

This application is a division of my application Serial No. 527,449, filed January 6, 1922.

This invention relates to electrical condensers.

The condensers of the present invention, of which several forms are illustrated and described, are of general application or use. By way of example, they are adapted for use as series antenna condensers, grid condensers, key condensers, bypass condensers, dummy circuit condensers and receiving circuit condensers, for amateur or commercial use in radio communication.

The condenser of this invention comprises a stack composed of alternate sheets of armatures and dielectric, the armatures comprising foil preferably of lead, tin or copper, and the dielectric being preferably of mica, with the sheets of foil and dielectric in intimate contact, or substantially so, and preferably treated with wax or some other insulating material.

An object of the invention is to provide a low cost, compact condenser of high efficiency.

Another object of the invention is to provide a construction of series sectional stack in which the leads may be brought out at opposite ends, irrespective of the number of sections, and even when there is an even number of sections.

Figure 2:
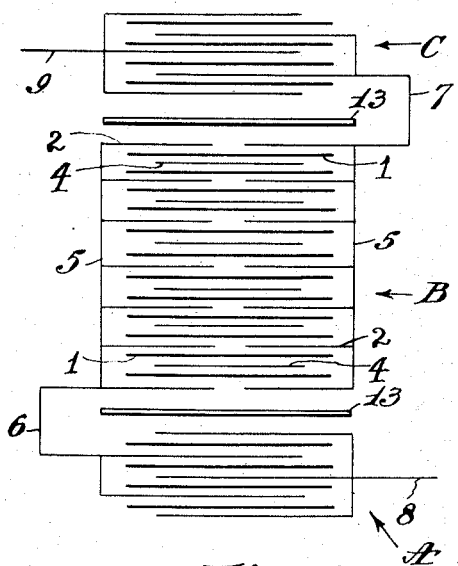
Figure 3:
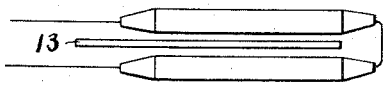
Figure 4:
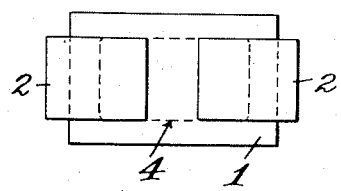
Figure 5:
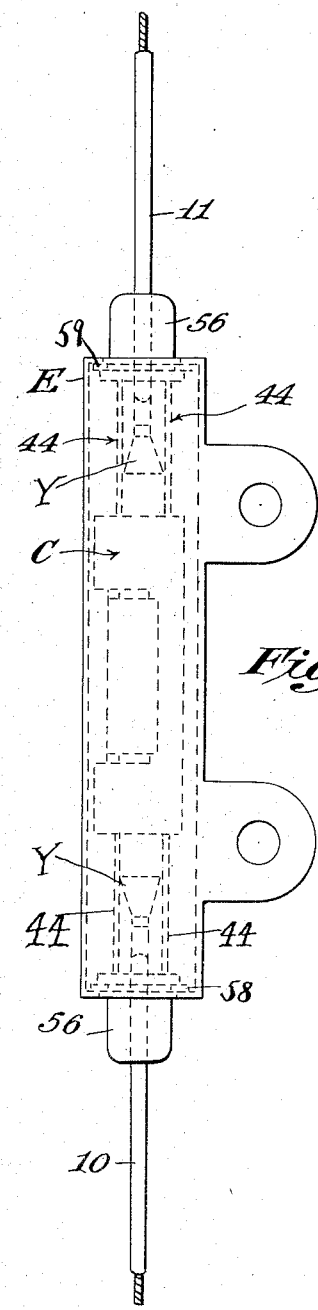

Of the drawing,

Fig. 1 is a diagrammatic expanded view of a condenser stack, illustrating the arrangement of sheets of dielectric and foil and their connections;

Fig. 2 is a diagrammatic expanded view of another form of condenser stack embodying the arrangement of Fig. 1 and Fig. 3 is a diagrammatic illustration of a series-sectional stack having an even number of single sections, as in the prior art, showing how the leads come out therein at the same end; and Fig. 4 is a plan of the so-called double section of Figs. 1 or 2; and Fig. 5 an elevation of the condenser stack of Figs. 1 or 2, completed, clamped, and encased ready for service.

In the type of condenser herein illustrated and described, in which the stack as a whole must be electrically divided into sections connected in series for desired potential, I found it impossible, using the type of series section stack now in use, (Fig. 3), to bring the terminal leads out from opposite sides of the stack unless the series-sectional stack consisted of an odd number of sections. Where the stack comprises an even number of sections each constructed in the usual manner and connected in series as illustrated in Fig. 3, the leads must be brought out from the same side of the stack, on opposite sides of insulating separator 13. Obviously, where there are an odd number of sections the terminal leads may be brought out from opposite sides of the stack. In Figs. 1, 2 and 4, however I have illustrated diagrammatically, (Figs. 1—2 being expanded), my invention whereby it is practicable to bring the terminal leads from opposite ends of the stack, even where the stack consists of an even number of sections connected in series. Referring to Fig. 1, I have illustrated a stack comprising one section D which I have called a "double" section to distinguish it from the single section of the type of condenser section now well known, as used as in Fig. 3 in the prior art.

Referring to Fig. 2, the stack comprises several sections A, B, C connected in series, these sections being of proper number, size and area for the required capacity and voltage. As here illustrated, the intermediate section B, a double section like section D, Fig. 1, comprises in effect two condensers connected in series but having integral series connections with each other, certain of the foil or armature sheets of this double section forming integral series connections between the two electrically distinct portions of the double section. For this purpose, I have provided a number of sheets of dielectric 1 (referring to section D, Fig. 1, for simplicity) on one side of each of which is a pair of foils 2 (Fig. 4) in the same plane and spaced apart from each other at their adjacent edges at 3 Fig. 1, and having their remote edges projecting as terminal leads beyond opposite ends of adjacent dielectrics 1. Upon the other face of each dielectric 1 is a single sheet of foil 4 (Figs. 1 and 4) which is arranged (Fig. 1) centrally of the sheets of dielectric 1, being spaced inwardly from all edges thereof, i. e., not projecting out beyond the dielectrics, and therefore constituting what is termed a "floating" armature. This foil 4 also is disposed centraly of the pair of spaced foils 2, but on the other face of the same dielectrical sheet 1; and, as will be seen later, the central parts of all foils 4 (i. e., the parts bridging foils, 2, 2 on the opposite face of dielectric 1) constitute the series connection between the two electrical sections of this double section. The pairs of spaced but projecting foils 2 alternate with foils 4, a dielectric sheet 1 lying between each floating foil 4 and a pair of foils 2. The non-projecting foils 4 also form common opposing armatures for the pairs of spaced projecting foils 2, forming therewith in effect two condensers connected in series, all the short foils 2 at the left electrically constituting one condenser and all of them at the right electrically constituting the other condenser. That is to say, there is a foil 4 between two adjacent sheets of dielectric, and there are pairs of edge-spaced foils 2 upon the opposite surfaces of said adjacent dielectrics, each foil 4 constituting a common opposing armature for each pair of foils 2, and all the foils 4 also serving as a series connection between the two condensers formed by foils 4 respectively with the two sets of foils 2. Figs. 1 and 2, it is to be understood, show expanded views of the stacks, and in actual construction the thickness of the stack would be very much less and such as to fit in suitable clamp C and casing E indicated in Fig. 5, the sheets of foil and dielectric being compressed into close contact with each other for best operation.

In finishing the double section D (Fig. 1) after its assembly, the portions of the foils 2 which project from one side of the stack are soldered together and the portions of the other foils 2 which project from the opposite side of the stack are soldered together, as illustrated diagrammatically by the lines 5 connecting stack foils in Figs. 1 and 2, thereby forming two opposite terminal leads 5 connected to terminals 10, 11 of Figs. 1 and 5. In order to strengthen the soldered leads 5, the outer foil elements (marked X) at the end of each double section may be of metal having greater strength than the inner stack-foils, intermediate the stack ends. For example, such inner foil elements 2 may consist of rather fragile lead foil, while the outer or end elements X may consist of copper foil or a heavier lead foil, which, when soldered together, prevents the tearing of the foil projections or terminals 5, as by mechanical stresses from the terminals 10, 11.

In order to understand the significance of the above arrangement of the parts 1, 2 and 4, consider a portion of Fig. 1, i. e., the top pair of foils 2, the mica dielectric 1 below them, the floating foil 4 below that, the next lower dielectric 1 and the next lower pair of foils 2. One of the two elemental electrostatic condensers of this double condenser section comprises the two left hand foils 2 one above the other, with the left portion of longer foil 4 and the left portions of the two mica sheets 1, 1; and the other elemental condenser comprises the two right hand foils 2 one above the other in Fig. 1 with the right hand portion of longer foil 4 and the right hand portions of the two mica sheets 1, 1; and the integral connection between the right and left halves of intervening longer and floating foil 4 constitutes the series connection between said two elemental condensers. By virtue of this construction, a special or "double" condenser section (D) is made suitable for incorporation as at B, Fig. 2, with ordinary sections A, C of a series sectional condenser.

This double section (D, Fig. 1 and B, Fig. 2) is, in electrostatic effect the same as two ordinary sections connected in series, i. e., the same in effect as sections A and C in Fig. 2 if they were connected directly in series with one another by conductors exterior of the stack without double section B itself. Hence in a four-section stack (electrostatically) as in Fig. 2, this double section takes the place of two separate sections like sections A and C and additional to A and C, so far as the electrostatic effect is concerned. But if the stack consisted of four separate sections like A and C, (or any even number of such sections) the terminal leads would have to be brought out from the same side of the series-sectional stack (Fig. 3); that being due to the facts (1) that the terminal leads from each such separate sections are brought out from the two opposite sides of such section, (2) that the two adjacent terminal leads of two adjacent separate sections are connected together in order to constitute the series-sectional condenser stack, and (3) that the other two terminal leads of such two adjacent sections are brought out on the same side of the stack of serially connected sections; so that in the case of a series-sectional stack of four or any other even number of sections, the two terminals of the stack, (i. e. those of high potential difference at opposite end sections of the stack), are at the same side of the stack. The object of the invention, however, is to provide a stack of serially connected sections wherein the oppositely poled stack-end terminal leads will extend from opposite sides of the stack, (especially when the number of sections is small and therefore the stack-end terminal leads of high potential difference will lie close together) and that object is attained by using double section B of Fig. 2 as one or more of the stack-sections which are separated from one or more adjacent sections by such an insulating separator as 13, and which are connected in series with one or more adjacent sections by such a stack-exterior connector as 6 or 7. And that object is attained by reason of the fact that double section B, altho electrostatically equivalent to two ordinary sections like A and C, yet differs from two prior adjacent separate sections (Fig. 3) in that it has only two external terminal leads, and those being on opposite ends of the assembly of condenser sheets, just as in the case of an ordinary section as A or C, Fig. 2. The reason why those leads (of the electrostatically double section) can be so brought out is to be found in the above-described construction of the double section itself. But the reason, more important in the invention, why a series-sectional stack having one or more double sections like section B, can have its two stack-terminal leads extend out from the same side of the stack, is that such electrostatically double section has, on its opposite sides, only two external terminal leads, so that so far as concerns the terminal leads and their connections to one another outside the stack to constitute the series-sectional stack, the situation is as if there were one less section (like A or C) in the stack. Thus, as in Fig. 2, altho, electrostatically, the stack comprises four sections, i. e., A, C and the two of double section B, yet it comprises only three sections, mechanically of which each has external terminal leads at opposite sides. In Fig. 2, if double section B were replaced by two single sections like A and C, (making four or an even number of ordinary separate sections) then the exterior stack-terminals 8 and 9 necessarily would lie on the same side of the stack as in the case of the even-number-section prior-art stack of Fig. 3. But owing to the fact that double section B has only two external terminal-leads 5, 5, (by which it is connected at 6 and 7 in series with single sections A and C), the series connection system of the stack-sections is such that the number of exterior series connections (6 and 7) is even. This has an effect which will be seen more clearly after the following detailed description of Fig. 2.

In Fig. 2, single sections A and C are connected at 6 and 7 in series with a double section B, (like D, Fig. 1), the single sections A, C being located on opposite sides of the double section B. The three sections are connected in series, via foils 2, at 6 and 7, i. e., alternately at opposite sides of the entire stack, as usual. But altho the sections are (in an electrostatic sense) even in number (four in all, including the two in double section B), yet on account of the novel nature of double section B, the terminal leads 8 and 9 are permitted to be brought out from opposite sides of the stack of three sections, as in Fig. 5 (oppositely poled terminals 10, 11) and as distinguished from Fig. 3 where the oppositely poled terminals must be brought out at the same side of the stack. Interposed between the sections A, B and C are insulating section separators 13, preferably of some cheap insulating material such as fish paper, or even the more expensive mica, which, when the condenser stack is assembled and soldered, will project beyond these sections as usual in series sectional condensers. The path of the condenser action through the double section B (Fig. 2) or D (Fig. 1) is through one group of spaced foils 2, (all those, say, at the left), through the dielectrics 1 to the floating foils 4, along the length of the latter and through the same dielectrics again to the second group of foils 2, i. e., all those, say, at the right; that is, the action traverses the dielectrics twice in going from one terminal lead 5 to the other.

Thus the series connectors (6, 7) between the end sections are even in number, so that the system is as follows. One stack-end terminal lead at 8 being at, say (Fig. 2) the right-hand side of section A, the first exterior connection 6 leads from the left of that section, around insulating separator 13 to the left of section B. (The number of exterior series connections for the stack of an even number of sections is prevented from being an odd number because one exterior series connection is permitted to be omitted by virtue of the fact that the two sections electrostatically existing in double section B are connected together inside section B by way of armatures 4). The second exterior connection 7 leads from the right-hand side of section B (just as if that section were a single section like A), around second insulator 13 to the right of section C. The other terminal lead of section C of course is at its left side; and since this section is the end section of the stack, its terminal lead 9 is the stack terminal lead. And, owing to the presence of double section B, the second stack-terminal lead 9 is at the opposite side of the stack from its first terminal lead 8.

The terminals, such as 8 and 9 (Fig. 2) or 10 and 11 (Fig. 1), comprise preferably stranded copper wire, (Fig. 5) that is, a composite conductor made up of very small wires stranded together but flared apart at the end (Y), Fig. 5, which is to be soldered to a projecting foil bunch, thereby providing a multi-point attachment of terminal to foil-bunch, that is, an attachment in which a number of very small flexible wires are soldered near their ends to the foil bunch projecting from an end section of the stack or from the double section alone of Fig. 1. This construction provides a very strong and permanent electrical connection between the foil bunches and the terminals 8—9 or 10—11, and allows a greater degree of flexibility and relative movement of the terminal wires without danger of stripping the leads then from the foils or of tearing the fragile foils to which the terminals are soldered, or otherwise damaging the electrical connections between leads and terminals.

Cover slips 13a of suitable insulating material may also be placed on opposite sides of the stacks as illustrated in Fig. 1.

The construction of the exemplary double section illustrated in Fig. 1, while providing, in effect, two condensers connected in series, allows the terminals 10 and 11 to be brought out at opposite sides of the stack. (Contrast Fig. 3.) The construction illustrated in Fig. 2, while providing electrostatically four condensers connected in series by way of leads 6 and 7 and by the foils 4 inside the double section, (and heretofore requiring the terminal leads to be brought out at the same side of the stack), also allows the terminals to be brought out at opposite sides of the stack. Where the number of electrostatic condensers or sections connected in series required is an odd number, electrostatically single sections like A or C may be used exclusively, as in the prior art, altho not necessarily, for a stack might consist of only sections A and B of Fig. 2 without the advantage of having the stack terminal leads at opposite sides of the stack. In any embodiment of the invention, for even numbers of electrostatic sections connected in series, either an odd number of double sections D, Fig. 1, may be used, as by stacking together an even number of double sections like D of Fig. 1, with insulating separators 13 between them as in Fig. 2, so as to cause the stack-terminals from the ends sections to extend from opposite sides of the stack; or an odd number of double sections with an even number of single sections may be stacked, as illustrated in Fig. 2 with the same result of stack-terminals from opposite sides of the stack-ends. As another example, for a stack having six electrostatic condensers or sections in series, there may be used either three double sections like D of Fig. 1, (with separators 13 and series connectors 6, 7 as in Fig. 2) or one of such double sections and four single sections like A or C of Fig. 2 with the usual separators 13 and connectors 6, 7. For a stack having eight sections or condensers connected in series, three double sections and two single sections may be used, or one double section and six single sections, in any case for the purpose of permitting the terminals to be brought out from opposite sides of the stack. Of course, a double section need not be located between single sections as shown in Fig. 2, but may be located at the end of the condenser.

The form of double section illustrated in Fig. 1 at D and in Fig. 2 at B, besides being capable of use for bringing the stack leads out at opposite sides of the stack of Fig. 2 and thereby lessening the insulation difficulties, obviates the necessity of soldering together the foil armatures of the two sections of a double section, and of providing a space for this soldering; the connections in this case being integral with their connected foil armatures and no sectional separator 13 being necessary inside the novel double sections. The double section type herein disclosed (Figs. 1, 2 and 4) has greater strength foil-terminals or tabs, (where the bunch of foils 2 are soldered together at 5 to which bunch the terminals 10 and 11 are connected), than a two-single sectional form of the prior art as illustrated in Fig. 3; because, for a stack of the same capacity and number of dielectrics, a larger number of foils 2 (twice as many) are employed in Figs. 1, 2 and 4 which are soldered together in a foil bunch.

The condenser double sections such as illustrated diagrammatically in Figs. 1 and 2 are built up preferably as are single sections A and C of Fig. 2, i. e. by stacking the foils and dielectric 1 in their proper order, preferably previously dipping the dielectric, which is preferably of mica, in melted or liquid insulating material such as paraffin or by building the stack in such melted or liquid insulating material. The stack unit or section is then placed in a pressing stand and heated in a bath of molten paraffin at a temperature of approximately 150° C. for about twenty minutes, removed from the bath and cooled under a pressure of the order of 600 pounds. The double section or stack should then be tested for breakdown and measured for capacity, just as in the case of a single section. In Fig. 2, where the single sections are combined with the double sections, all the physically separated sections are connected together in series by soldering together the foil-bunches at 6 and 7, the permanent insulating separators 13 being inserted between each pair of physically separate sections. The stack of sections is then secured in its clamp or casing, or both, which may be of any desired construction as clamp C in casing E in Fig. 5.

Here is provided a series sectional stack under practical operating conditions of clamping and encasement and consisting of an even number of sections, physically separate from one another but in which the terminals (10, 11, Fig. 5) may be and are brought out at opposite ends of the condenser as a whole, and directly connected to terminal leads 8, 9 of Fig. 2 brought out from opposite sides of the condenser terminals 10, 11 are insulated from casing E and from each other by means of the mica end pieces 58, 59 and insulating bushings 56 at the open ends of the casing, and by the insulating sheets 44 (as mica) projecting beyond the stack and the clamp C, and around the soldered connections between the projecting stack-foils and the flared (Y) bared ends of the insulated stranded terminals 10, 11. It is by means of a double section shown in Fig. 1 at D and in Fig. 2 at B that it is made possible to bring out the two terminals at opposite portions of the stack and condenser, when there are two sections (or any even number) in the stack; all as contrasted with the prior art in Fig. 3.

In addition to the matter of bringing out the stack-terminals from opposite sides of the series sectional stack, adapting the latter to use with clamp and/or casing of Fig. 5, whether the number of electrostatic sections is odd or even, the advantages of the invention include the very desirable feature of stronger soldered projecting foil-bunches, and (in each double section) the provision of series connections inside the stack thereby eliminating outside foil connections between the two electrical sections of double sections, certain foils however (2, 2) projecting outside the stack to provide exterior foil leads permitting attachment of condenser terminals or permitting soldering into series connection with other and adjacent sections of a series-sectional stack as in Fig. 2.

I claim:—

1. An improved stack-sheet condenser of the general series-sectional type and including electrostatically double and single sections in a stack including insulating separators between adjacent physical sections, said stack including electrostatically single sections and a number of electrostatically double sections sufficient to constitute an even number of electrostatic sections, an even number of insulating section-separators, and an odd number of physical sections.

2. An improved stack-sheet condenser of the general series-sectional type and including an odd number of physical sections connected in series with one another and one less insulating separators respectively between adjacent physical sections, said odd number of sections including an odd number of electrostatically double sections and an even number of electrostatically single sections and an even number of insulating section-separators; each of all the sections having its oppositely-poled armatures projecting as section-terminals from opposite sides of the stack, and the provision of the odd total number of physical sections causing the projecting-armature terminals of the end sections of the stack to project from opposite sides of the stack.

3. An improved stack-sheet condenser of the general series-sectional type and including an even number of electrostatic sections, at least four, connected in series, said even number of electrostatic sections being distributed between an odd number of physical sections in the stack, in number less than the number of electrostatic sections; at least two of the electrostatic sections being consolidated in a single physical section wherein the two electrostatic sections are connected in series by connecting means inside the double section; insulating separators between adjacent physical sections; and series connection between adjacent physical sections consisting of projecting armature sheets from the same sides of the adjacent sections and extending externally of the stack around the insulating separators.

4. An improved stacked-sheet condenser of the general series-sectional type wherein adjacent sections are isolated electrostatically from one another by insulating sheets thicker than the dialectric sheets and placed between and electrostatically separating the adjacent sections, said sections being connected together electrically by way of connections of their projecting armature sheets extending around the insulating separators, in which type a stack comprising an even number of sections includes an odd number of insulating separators and the armatures projecting as stack-terminals from the end sections of the stack naturally extend from the same side of the stack, said improved condenser having an even number of at least four electrostatic sections and of insulating separators, and projecting armatures extending as stack-terminals from the end sections of the stack from opposite sides of the stack by virtue of the inclusion in the stack of at least one electrostatically double section having oppositely-poled armatures projecting as section-terminals from opposite sides of the stack, said projecting armatures including two separate edge-spaced armature sheets on one face of a given dielectric sheet but respectively projecting from opposite sides of the double section and the stack, and said double section including a relatively large armature sheet on the opposite face of said given dielectric sheet, and inwardly spaced from all the edges of said dielectric sheet but overlapping said two relatively small spaced armature sheets on the first face of said dielectric sheet.

5. An improved stacked-sheet condenser of the general series-sectional type wherein adjacent sections are isolated electrostatically from one another by insulating sheets thicker than dielectric sheets and placed between and electrostatically separating the adjacent sections, said sections being connected together by way of connections of their projecting armature sheets extending around the insulating separators, in which type a stack comprising an even number of sections includes an odd number of insulating separators, and the armatures projecting as stack-terminals from the end sections of the stack naturally extend from the same side of the stack, said improved condenser having an even number of at least four electrostatic sections and of insulating separators and projecting armatures extending from opposite sides of the stack as section-terminals by virtue of the inclusion in the stack of at least one electrostatically double section having oppositely poled armatures projecting from opposite sides of the double section as section-terminals by virtue of electrical connections inside the double section between the two electrostatic portions thereof.

6. An improved stack-sheet condenser of the general series-sectional type, said condenser having an even number of electrostatic sections, an even number of insulating separators respectively between adjacent sections, and projecting armatures extending from end sections of the stack as stack-terminals from opposite side of the stack by virtue of the inclusion in the stack of at least one electrostatically double section having only two projecting-armature terminals which respectively project from opposite sides of the electrostatically double section.

7. A series-sectional condenser stack which includes at least two successively adjacent physical sections constituting an even number of electrostatic sections, an insulating separator between and isolating adjacent physical sections electrostatically from one another, and series connections between adjacent physical connections constituted by connected armature-projections respectively extending exteriorly of the stack from the adjacent sections and lying on the same side of the stack and extending around the insulating separator; at least one of the physical sections so isolated and so connected to an adjacent physical section on the stack, being constituted by an electrostatically double section of which the two portions are connected in series electrically in the interior of the double section itself.

8. A series-sectional condenser stack including at least two physically separate sections of which at least one is an electrostatically double section of which the two electrostatic portions are connected together in series with one another by way of armatures in the interior of such double section.

In testimony whereof I hereunto affix my signature.

WILLIAM H. PRIESS.